United States Patent
Galic (10) Patent No.: US 8,380,009 B2
(45) Date of Patent: Feb. 19, 2013

(54) RESOLUTION ADJUSTMENT OF AN IMAGE THAT INCLUDES TEXT UNDERGOING AN OCR PROCESS

(75) Inventor: Sasa Galic, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 12/721,705

(22) Filed: Mar. 11, 2010

(65) Prior Publication Data

US 2011/0222794 A1    Sep. 15, 2011

(51) Int. Cl.
*G06K 9/32* (2006.01)
*G06K 15/02* (2006.01)

(52) U.S. Cl. .................................. 382/298; 358/1.2

(58) Field of Classification Search .............. 382/100, 382/181, 183, 190, 60, 263, 286, 298, 300, 382/305, 312; 358/1.2, 528; 345/467, 469.1, 345/472, 472.1, 472.2
See application file for complete search history.

(56) References Cited

U.S. PATENT DOCUMENTS

| 5,544,288 | A  | * | 8/1996  | Morgan et al. | 715/801 |
| 5,583,949 | A  |   | 12/1996 | Smith et al. | |
| 6,233,353 | B1 |   | 5/2001  | Danisewicz | |
| 6,249,604 | B1 | * | 6/2001  | Huttenlocher et al. | 382/174 |
| 6,922,487 | B2 | * | 7/2005  | Dance et al. | 382/190 |
| 7,271,806 | B2 | * | 9/2007  | Everett | 345/471 |
| 7,283,669 | B2 |   | 10/2007 | Andel et al. | |
| 7,454,063 | B1 |   | 11/2008 | Kneisl et al. | |
| 7,492,482 | B2 | * | 2/2009  | Gao | 358/3.13 |
| 7,508,984 | B2 | * | 3/2009  | Ohguro | 382/181 |
| 8,160,297 | B2 | * | 4/2012  | Mohr et al. | 382/103 |
| 2006/0017752 | A1 | | 1/2006 | Kurzweil et al. | |
| 2007/0201757 | A1 | | 8/2007 | Madej et al. | |
| 2008/0056537 | A1 | | 3/2008 | Furusawa | |
| 2008/0170785 | A1 | | 7/2008 | Simmons et al. | |

FOREIGN PATENT DOCUMENTS

| JP | 08-152871 A | 6/1996 |
| JP | 09-237319 A | 9/1997 |
| JP | 2010-026805 A | 2/2010 |
| KR | 10-2008-0101388 A | 11/2008 |

OTHER PUBLICATIONS

Park, et al., "OCR in a Hierarchical Feature Space", Retrieved at << http://citeseerx.ist.psu.edu/viewdoc/download?doi=10.1.1.32.9865 &rep=rep1&type=pdf >>, IEEE Transactions on Pattern Analysis and Machine Intelligence, vol. 22, No. 4, Apr. 2000, pp. 20.

Ye, et al., "Automatic Text Segmentation from Complex Background", Retrieved at << http://citeseerx.ist.psu.edu/viewdoc/download?doi=10.1.1.83.4741&rep=rep1&type=pdf >>, International Conference on Image Processing, ICIP '04. Oct. 24-27, 2004, pp. 2905-2908.

Author Unknown, "OmniPage 17 Upgrade", Retrieved at << http://www.softwarecasa.com/omnipage-upgrade.html >>, Retrieved Date: Oct. 29, 2009, pp. 2.

(Continued)

*Primary Examiner* — Kanjibhai Patel
(74) *Attorney, Agent, or Firm* — Mayer & Williams PC (57) ABSTRACT

A system and method is provided which rescales a received image to an optimal size to undergo an optical character recognition (OCR) process. The system includes an optimal size determination component that determines an optimum size for the image such that processing time of the received image is minimized without affecting accuracy. The optimal size determination component determines the optimum size of the image based at least in part on a dominant interline spacing of text and a dominant text height. The system also includes a rescaling component that resizes the received image to the determined optimum size.

18 Claims, 9 Drawing Sheets

OTHER PUBLICATIONS

Author Unknown, "ABBYY FineReader 8.0 Pro", Retrieved at << http://www.rla.com/assistive/software/abbyy/finereader.htm >>, Retrieved Date: Oct. 29, 2009, pp. 5.

International Search Report from corresponding PCT Application PCT/US2011/027770, dated Sep. 28, 2011, 8 pages.

* cited by examiner

FIG. 1

Processing time as a function of number of input pixels

FIG. 2

Accuracy as a function of number of input pixels

RESOLUTION ADJUSTMENT OF AN IMAGE THAT INCLUDES TEXT UNDERGOING AN OCR PROCESS

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is generated by an imager-based scanner, because the text/picture is scanned from a distance, from varying orientations, and in varying illumination. Even if the performance of scanning process is good, the performance of the OCR engine may be degraded when a relatively low quality page of text is being scanned.

SUMMARY

The amount of image processed needed to perform OCR can be quite large, requiring a significant amount of time and processing power. The duration of the image processing procedure almost exclusively depends on input image size. An image size may thus be deemed to be optimal (with respect to the image preprocessing procedure) when any further decrease in resolution yields lower accuracy, while an increase in resolution does not yield noticeably better accuracy. In this way the image preprocessing algorithm provides good accuracy while requiring as little time as possible.

In one implementation, the optimal size of an image is determined based on two properties of the text in the image, specifically, the text x-height (XH) and the inter-line spacing (ILS). Once these values are known, the optimal image resolution can be accurately calculated. Since these properties may not be uniform throughout an image, their dominant values throughout the image may be used. In one particular implementation, the dominant inter-line spacing is determined using an autocorrelation function and the dominant text x-height is determined using a cross-correlation function. One the optimal size is determined, the image is resized to this optimal size.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
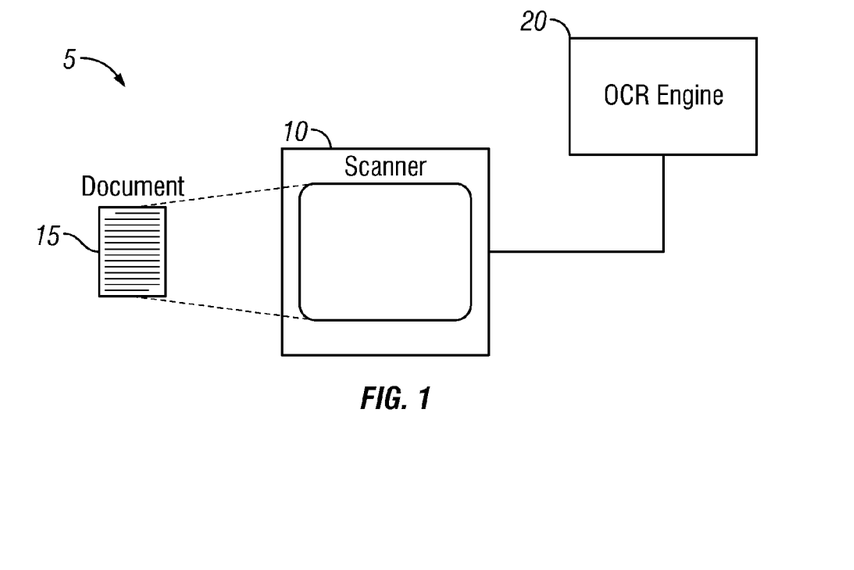
FIG. 1 shows one illustrative example of a system for optical character recognition.

FIG. 1 shows one illustrative example of a system 5 for optical character recognition (OCR) in an image which includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

The algorithm employed by the OCR engine 20 is generally constrained by two goals: high accuracy and low execution time. Clearly these two goals are quite opposite; higher execution time allows for additional processing, which yields higher accuracy, whereas less processing saves time but results in lower accuracy. Therefore, some compromise must be made.

Unfortunately, image preprocessing is generally quite lengthy. For instance, an ordinary image usually contains several millions of pixels, which means that the image preprocessing algorithm has this same number of inputs to evaluate and process. The duration of the image processing procedure almost exclusively depends on input image size, namely the higher the image size, the more time that is required. Therefore, the input image should either be downscaled to achieve the best possible performance without affecting the accuracy, or upscaled to maximize the accuracy with some acceptable performance degradation. In other words, rescaling the input image to the optimal image size should ensure the best possible tradeoff between the accuracy and the execution time.

One way to address this issue is to recognize that not all of the pixels in an image carry the same amount of information. Consequently, not all of the pixels need to be processed in order to achieve good accuracy. In fact, it may be the case that some pixels do not carry enough information (or at least do not carry information in a convenient form) for successful processing. This also means that, depending on the image structure, the size of the input image may be changed to yield optimal processing both in terms of accuracy and execution time.

Figure 2:
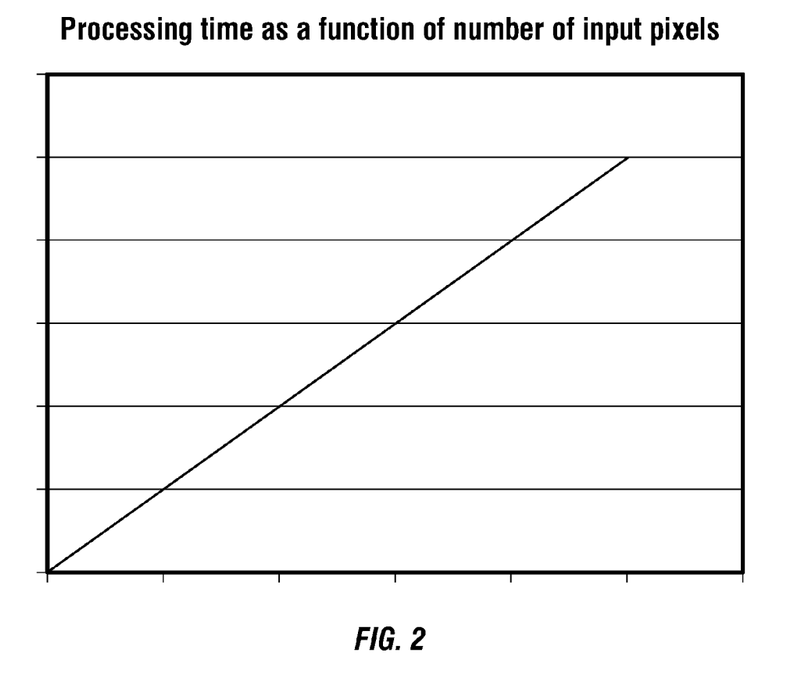
FIG. 2 shows illustrates the OCR processing time as a function of the number of input pixels.
Figure 3:
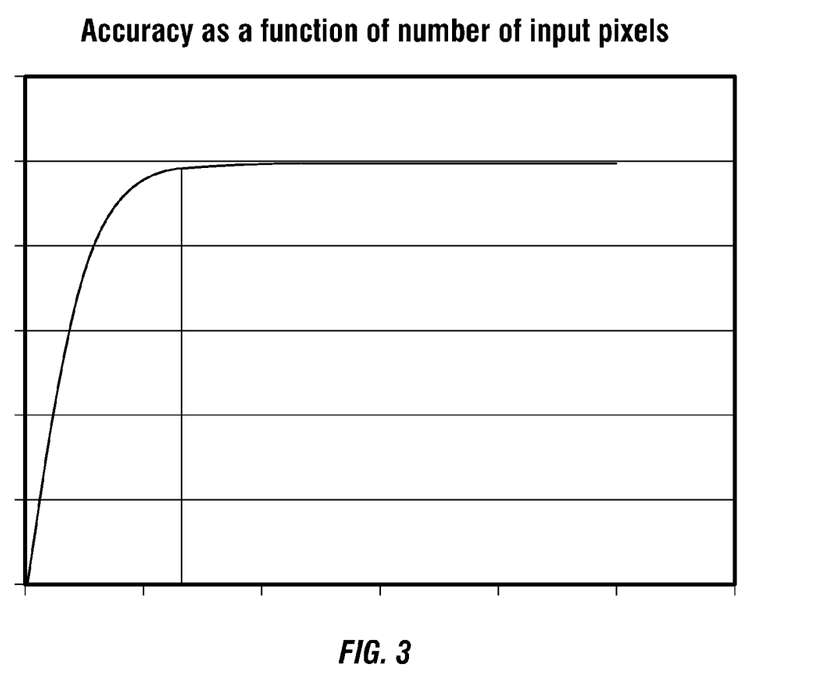
FIG. 3 illustrates the achievable accuracy of an OCR process as a function of the number of input pixels.

Theoretically, the execution time is a monotonically increasing function of the number of input pixels; the same goes for accuracy. However, these two functions have considerably different forms. FIG. 2 shows a rough example of the processing time as function of the number of input pixels. FIG. 3, one the other hand, shows a rough example of the achievable accuracy as a function of the number of input pixels.

Clearly, FIG. 2 shows that the execution time is linear with respect to the number of input pixels. On the other hand, the accuracy increases rapidly at first, but begins to saturate at some point. That is, the accuracy curve asymptotically approaches the maximum possible accuracy. The saturation point represents the optimal number of pixels that the image preprocessing component needs to receive in order to achieve the best possible tradeoff between accuracy and execution time.

The previous analysis leads to a principle that is used to develop the resolution adaptation algorithm presented herein. The image size is optimal (with respect to the image preprocessing procedure) if any further decrease in resolution yields lower accuracy while an increase in resolution does not yield noticeably better accuracy. In another words there is a point of diminishing returns where additional execution time is not warranted by the small gain in accuracy that might at best be achieved. In this way the image preprocessing algorithm provides good accuracy while requiring as little time as possible.

The aforementioned principle is relatively abstract and cannot be easily implemented since optimal size is dependent of the properties of the image. To develop more mathematical criteria a few important observations need to be made. The first thing to note is that any modification to the resolution of an image will have the largest impact on the text objects in the image since they are generally the smallest objects in an image. Therefore, the influence of a change in resolution on textual objects should be examined in more detail.

Figure 4:
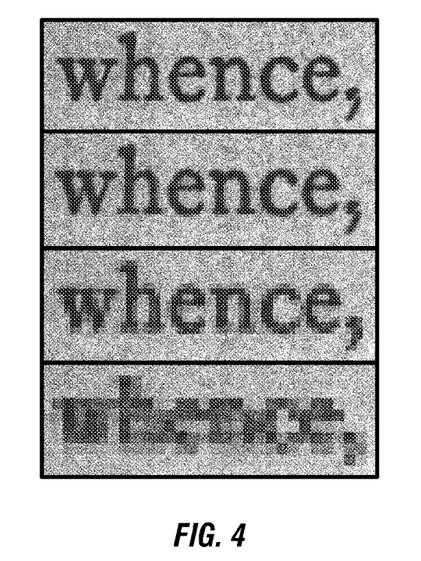
FIG. 4 shows a word that decreases in resolution from the top to the bottom of the figure by 2, 4 and 8 times, respectively.

The impact of decreasing levels of resolution on a textual object is illustrated using FIG. 4, which shows a word that decreases in resolution from the top to the bottom of the figure by 2, 4 and 8 times, respectively. As shown, there is point reached where any further decrease in resolution causes the text to become illegible. Before quantifying this point the following terms need to be defined.

First, the "base line" is defined as a horizontal line passing through the bottom ends of a majority of the characters in a line of text (excluding descenders). Second, the "mean-line" is defined as a horizontal line which passes through the top ends of a majority of the characters in a line of text (excluding ascenders). Third, the "x-height" is defined as the vertical distance between the base-line and the mean-line, which corresponds to the height of a majority of lowercase letters in the line (excluding non-descenders and non-ascenders).

Returning to FIG. 4, the point at which any further decrease in resolution causes the text to become illegible may be defined as some predefined minimum x-height value. The manner in which this value is determined will be discussed later in this document.

Figure 5:
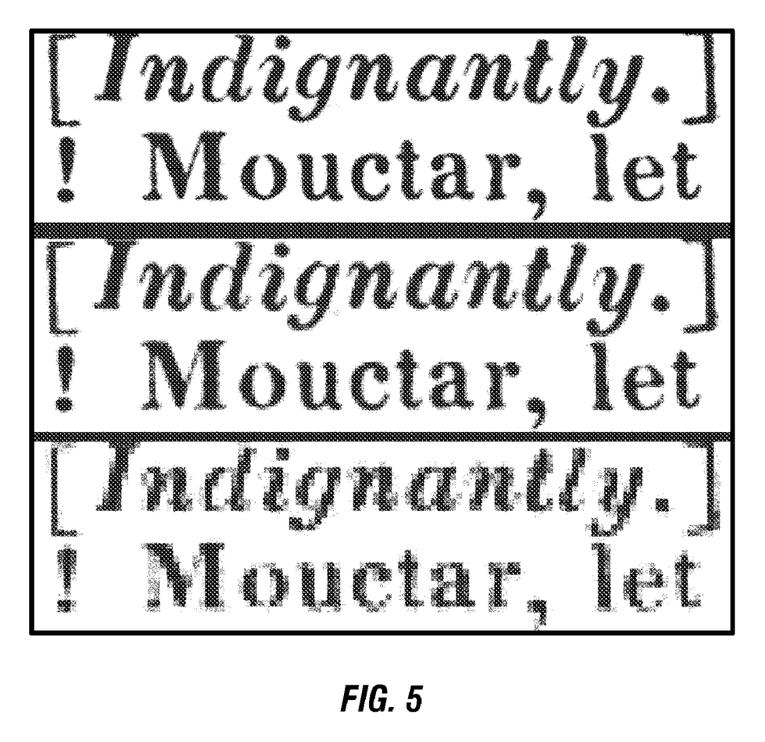
FIG. 5 illustrates the affect of a change in resolution on two neighboring lines of text, which shows a decrease in resolution from the top to the bottom of the figure by 2 and 4 times, respectively.

In addition to examining the effect of a decrease in resolution on an individual text object (e.g., a single character), its effect on a group of textual objects should also be examined. FIG. 5 illustrates the affect of a change in resolution on two neighboring lines of text, which shows a decrease in resolution from the top to the bottom of the figure by 2 and 4 times, respectively. It is evident that a modification to the resolution also affects the integrity of the textual line. The text in the third (i.e., bottom) image of FIG. 5 is still quite legible, but two words from different lines have started to touch each other, thus destroying the vertical integrity of the textual lines. Therefore, another criterion that may be applied is to ensure that any change in resolution does not yield text with an interline spacing smaller than some predefined minimum inter-line spacing $ILS_{min}$. The manner in which this value is determined will be discussed later in this document.

Based on the previous discussion, it can be concluded that two properties of text that should be calculated prior to making a decision about the optimal image resolution are text x-height (XH) and inter-line spacing (ILS). Once these values are known, the optimal image resolution can be accurately calculated.

Figure 6:
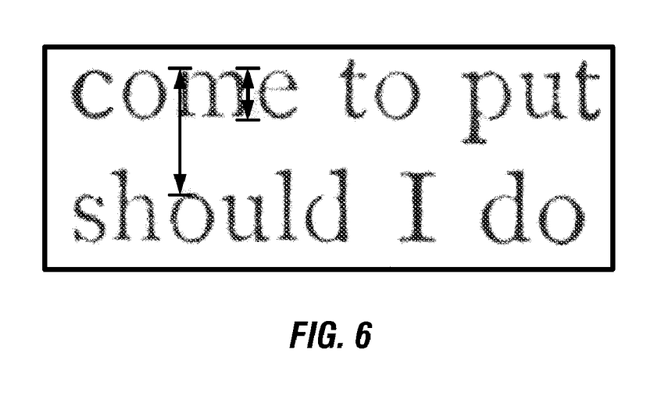
FIG. 6 illustrates the dominant text x-height and the dominant interline spacing for a sample of text.

Unfortunately, the logic that calculates these values needs to be very fast. Spending too much time finding the optimal resolution will cancel any positive effects of any subsequent reduction in processing time arising from using the image at its optimal resolution. An additional difficulty arises because the properties of the text may not be uniform throughout the image. As a consequence one may extract local text properties that differ depending on where the textual lines are located in the image. Of course, locating text is a time consuming process which makes such an approach impractical. Accordingly, the algorithm that is discussed below will employ the dominant text properties. In this way text properties may be estimated without actually locating different portions of text within the image. FIG. 6 illustrates the dominant text x-height and the dominant interline spacing for a sample of text.

The interline spacing can be determined as follows. The first thing to note is self-evident, which is that textual lines have a horizontal orientation (indeed, for purposes of this analysis the horizontal direction may be defined as the direction in which the textual lines in an image extend). Another thing to note is the sudden change in color that occurs at the transition between the text and the background. These two observations lead to the conclusion that the vertical projection of an edge filter which detects horizontal edges should provide values with dominant peaks occurring at the reference line (e.g., the mean-line or base-line, depending on the text-background color relationship) of the textual lines. A well-known example of a suitable filter is a horizontal Sobel filter, which yields positive values having dominant peaks at the reference line.

Figure 7:
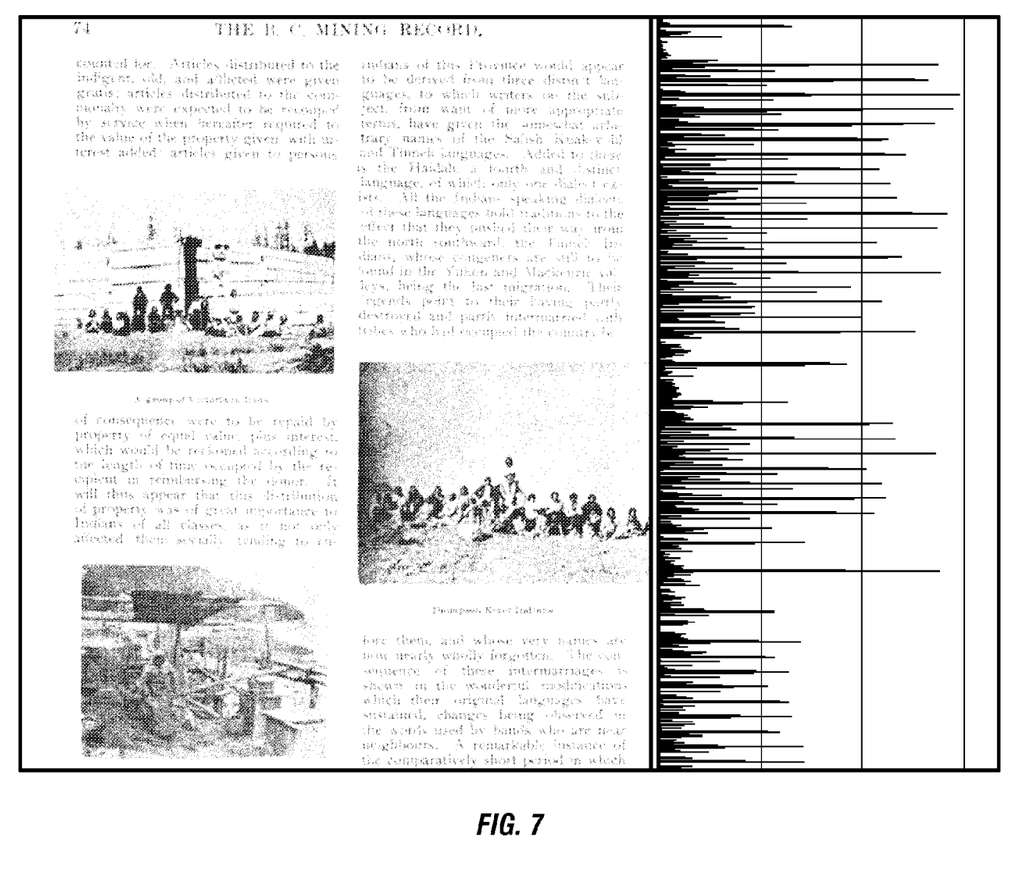
FIG. 7 shows a sample image that includes text as well as the vertical projection of the horizontal edges of the image as determined by a Sobel filter.

FIG. 7 shows a sample image that includes text as well as the vertical projection of the horizontal edges of the image as determined by a Sobel filter. As the figure demonstrates, the image yields very distinct peaks that are not adversely impacted even by the presence of some non-textual objects. The figures also shows that the distance between two successive peaks corresponds to the inter-line spacing. Unfortunately, this procedure cannot be used in general to estimate the interline spacing since the interline spacing may not be uniform across an entire image. As a result the interline spacing calculated in this way may be correct for one part of the image and incorrect for another part. Accordingly it is better to use the dominant inter-line spacing across the image.

One convenient way to determine the dominant inter-line spacing is by means of autocorrelation. The autocorrelation of a discrete signal x(t) is defined by:

$$R_{xx}(\tau) = \sum_{n} x(n)x(n-\tau).$$

One useful property of the autocorrelation function is that if a signal x(t) is periodic with a period T, then its autocorrelation $R_{xx}(\tau)$ is also periodic with period T. Furthermore, if the signal x(t) is finite, meaning $\forall t > T_{max} \Rightarrow x(t)=0$ (in the present case the signal has non zero values in the range [0, H−1] where H is the image height), then its autocorrelation function reaches its maximal value at the origin and generally decreases with increasing distance from the origin. This also means that the periodicity will be the most pronounced around the origin. These features are illustrated in FIG. 8, which shows the original image on the right, the vertical projection of the dominant peaks of the Sobel filter on the left, and the autocorrelation in the middle.

Figure 8:
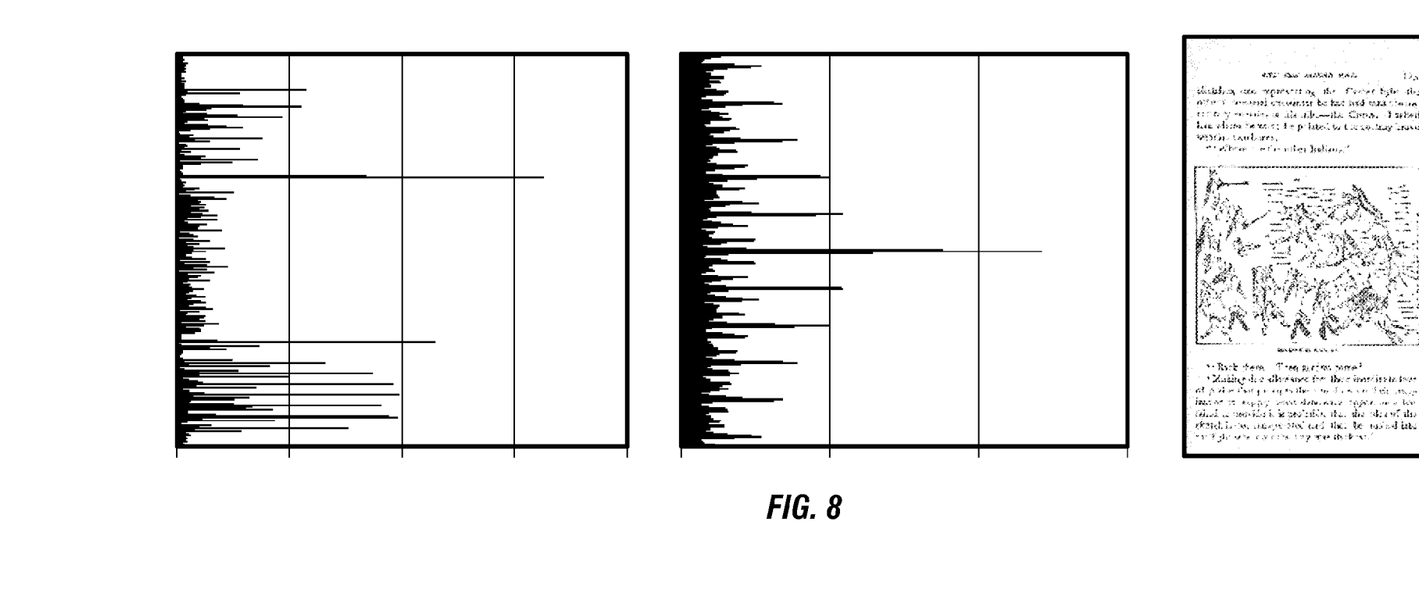
FIG. 8 shows an original image on the right, the vertical projection of the dominant peaks of the Sobel filter on the left, and the autocorrelation in the middle.

The autocorrelation function depicted in FIG. 8 has the highest peak at the origin. It also has the same distance between neighboring peaks. It is now much easier to find the dominant interline spacing. One approach may be to find the second dominant peak (the first one is at zero) and to declare the difference between these two peaks to be dominant inter-line spacing. Unfortunately, while this would work in the particular case depicted in FIG. 8, it may not generally. For instance, if there are several different interline spacings in an image or page then this approach will find one of them and completely ignore the others. Additionally, in the event that there is just a small amount of text in an image, then it is possible that other page objects (pictures and other graphics, straight lines etc.) will completely mask the autocorrelation regularity introduced by the presence of the text. In both cases the wrong decision would probably be made. Thus, another approach should be chosen.

It has already been mentioned that if there is dominant text on the image or page, then there will be a pronounced periodicity in the autocorrelation function. If this periodicity can be detected and its period extracted, then this period will correspond to the dominant interline spacing. A common way of examining the periodicity of the signal is to observe its spectral content. The spectral content of the signal x(t), t=0, . . . , H−1 is calculated using a discrete Fourier transform defined by:

$$X(k) = \sum_{t=0}^{H-1} x(t)e^{-\frac{2\pi i}{H}kt}, \quad k = 0, \ldots, H-1$$

What is of particular interest is the magnitude spectrum |X(k)| of the Fourier transform. The magnitude spectrum of a periodic signal x(t) with period T is discrete, meaning $$\forall k \neq i\frac{H}{T} \Rightarrow |X(k)| = 0; \quad (i \in N).$$

In another words, the magnitude spectrum of the periodic signal has non-zero harmonics just at the frequencies which are equal to integer multiples of the base frequency $$f_b = \frac{H}{T}.$$

Figure 9:
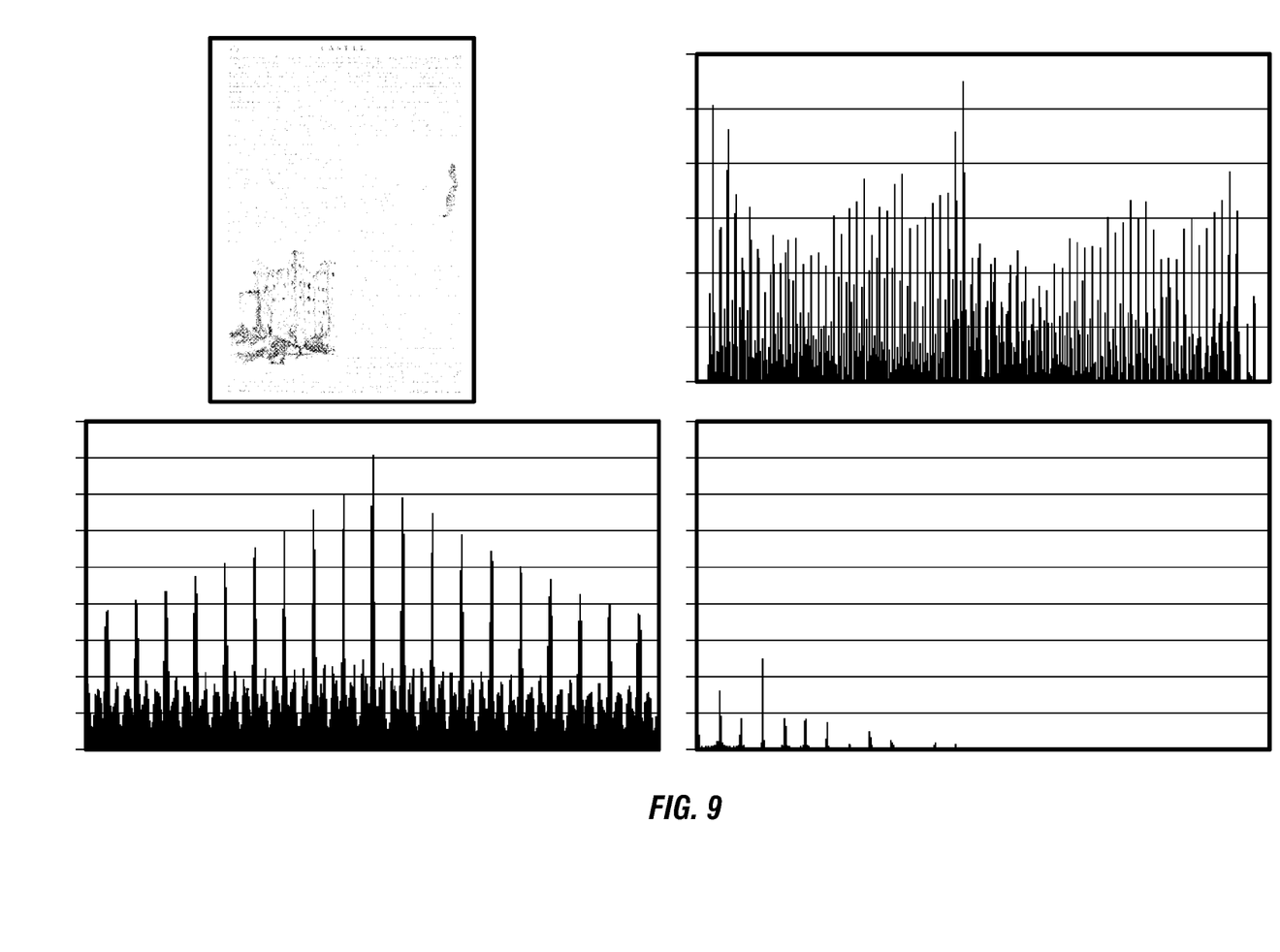
FIG. 9 shows an original image in its upper left portion, the vertical projection of the sobel edges of the image in the upper right portion, the autocorrelation of the vertical projection in the lower left portion, and the magnitude spectrum of the autocorrelation in the lower right portion.

If it can be verified that the magnitude spectrum of the autocorrelation function (also referred to as power spectrum of the original signal x(t)) is discrete, then the input signal must be periodic and its period is equal to the interline spacing. An example of the magnitude spectrum is given in FIG. 9. The upper left portion FIG. 9 shows the original image, the upper right shows the vertical projection, the lower left showing the autocorrelation and the lower right shows the magnitude spectrum.

Based on the above analysis, the interline spacing detection algorithm may be summarized in the following sequence of steps:

1) Calculate the positive horizontal edge projection of the input image;
2) Calculate the autocorrelation of the horizontal edge projection;
3) Calculate the power spectrum;
4) Find the position of the maximal peak in autocorrelation function (excluding peak at zero) $T_{max}$.
5) Calculate the base frequency $$f_b = \frac{H}{T_{max}}.$$

6) Verify that dominant peaks at power spectrum are integer multiple of $f_b$.
7) If the frequency $f_b$ passes the verification in step (6), then $T_{max}$ is declared to be the dominant inter-line spacing, otherwise the maximal peak is found in $[0, T_{max}]$ and the procedure is restarted from step (5).

This procedure either gives the dominant inter-line spacing or it fails. In the case of failure the attempt to adjust the resolution is aborted since the input image is probably too complex to calculate the dominant text height efficiently.

If, on the other hand, the dominant interline spacing is found then the dominant text x-height should next be calculated in order to determine the optimal image size of the document. Although this may be accomplished in a number of different ways, one particularly elegant way to perform this calculation is to use the cross-correlation of the positive edges and negative edges of the vertical projection.

The cross-correlation of two signals x(t) and y(t) is defined by:

$$R_{xy}(\tau) = \sum_{t} x(t)y(t+\tau)$$

Figure 10:
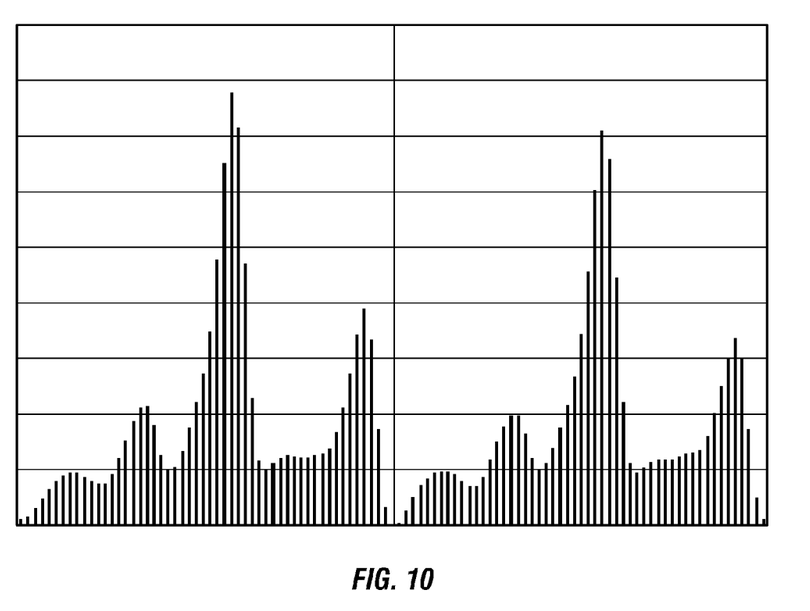
FIG. 10 shows an example of the cross-correlation of the positive (right portion of figure) and negative edge (left portion of figure) projections of the input image.

The cross-correlation is similar in form to the auto-correlation so it maintains all the properties of the auto-correlation which were previously mentioned. Since the dominant text height TH is smaller than the dominant interline spacing ILS, the cross-correlation is interesting only in the range [−ILS, ILS]. FIG. 10 shows an example of the cross-correlation of the positive and negative edge projections. The absolute values of the positions of the maximal peaks in the negative range (left portion of the figure) and positive range (right portion of the figure) are denoted |P_−| and |P_+|, respectively.

FIG. 10 reveals several interesting properties. First, the negative and positive portions of the image are almost the same. Also the cross-correlation within the given range generally has three dominant peaks on both sides. Looking at the negative portion, the first peak originates from the stroke width, the second peak originates from the text x-height and the third and final peak originates from the text bottom. Also, the most pronounced peak corresponds to the text x-height, which is exactly what is needed from the calculation.

Based on the above analysis, one algorithm for calculating the text x-height can be summarized as follows:

1) Calculate the positive horizontal edge projection of the input document image.
2) Calculate the negative horizontal edge projection of the input document image.
3) Calculate the cross-correlation of the two edge projections.
4) Find the position of the most dominant peaks on both sided of origin $P_-$ and $P_+$.
5) Estimate the dominant x-height using $XH=\min(|P_-|,|P_+|)$.

This algorithm may also be used to validate the results of the algorithm used to determine the dominant interline spacing. Namely, if the ILS is accurately calculated then the relation $|P_-|+|P_+|\approx ILS$ holds. Otherwise, the calculated values of ILS and XH should not be treated as reliable.

At this point the text properties needed for assessing the optimal image size are calculated. The resolution adjustment ratio RAR can be calculated using the formula:

$$RAR = \frac{XH_{min}}{XH}$$

under the constraint that RAR<1 is applicable only if $$\frac{ILS}{TH} > R_{min},$$

where $XH_{min}$ and $R_{min}$ are empirically calculated constants that ensure good image preprocessing accuracy. The RAR is calculated in such a way that it ensures text legibility while the constraints imposed upon it ensure that there will be no symbols vertically touching one another if the resolution is decreased. In some implementations the following illustrative values are suitable to ensure good accuracy and performance results: $XH_{min}\in[6,15]$ and $R_{min}\in[2.0,3.0]$.

Figure 11:
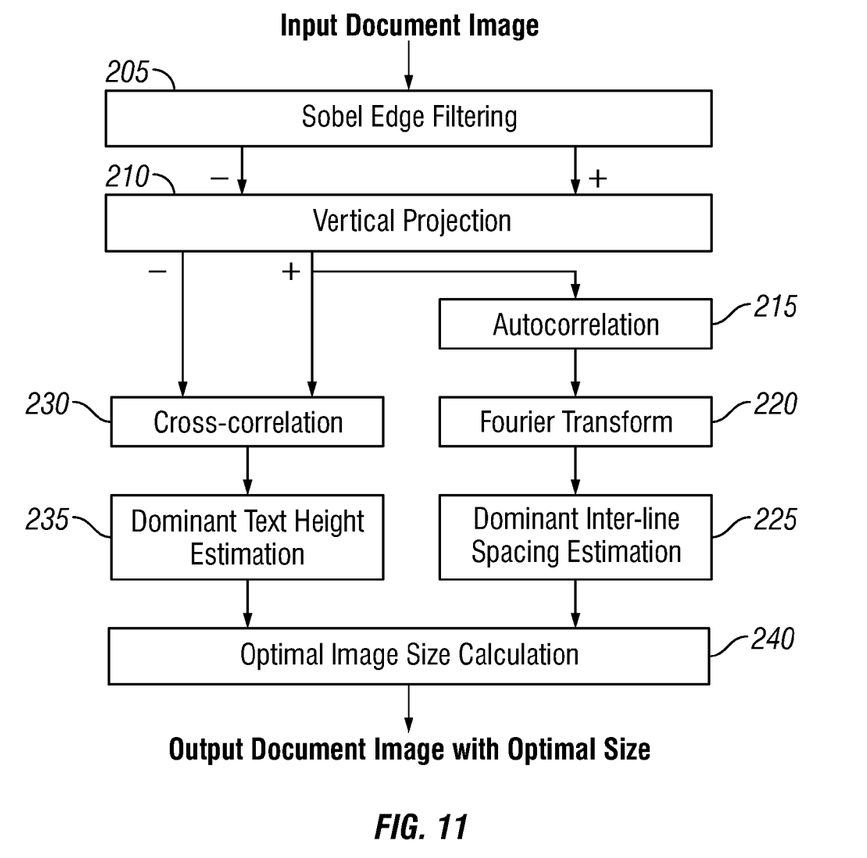
FIG. 11 is a flowchart showing one example of a process for rescaling a received image to an optimal size.

FIG. 11 is a flowchart showing one example of a process for rescaling a received image to an optimal size. After receiving the image, the process begins in step 205 where Sobel edge filtering is employed to obtain the positive and negative horizontal edge projections, which for simplicity are referred to as the positive and negative edges. Next, in step 210, the vertical projections of the positive and negative edges are determined. The autocorrelation function of the vertical positive edge is determined in step 215, after which it undergoes a discrete Fourier transform in step 220 to obtain the magnitude spectrum of the autocorrelation function. The position of the maximal peak in the autocorrelation function is determined in step 225, from which the dominant inter-line spacing is obtained. In step 225 the magnitude spectrum is examined to verify that the dominant inter-line spacing which has been determined is correct.

Returning to step 210, in which the vertical projection of the positive and negative edges are obtained, these values are used to obtain the cross-correlation of the edges in step 230. In step 235 the dominant text height is estimated from the most dominant peaks on both sides of the origin of the cross-correlation function. Finally, the estimated values of the dominant inter-line spacing and the dominant text height are used in step 240 to obtain the optimal image size that should be used during the OCR process. Subsequent steps, not shown, adjust the image size so that it is equal to the optical image size and complete the remaining steps of the OCR process.

Figure 12:
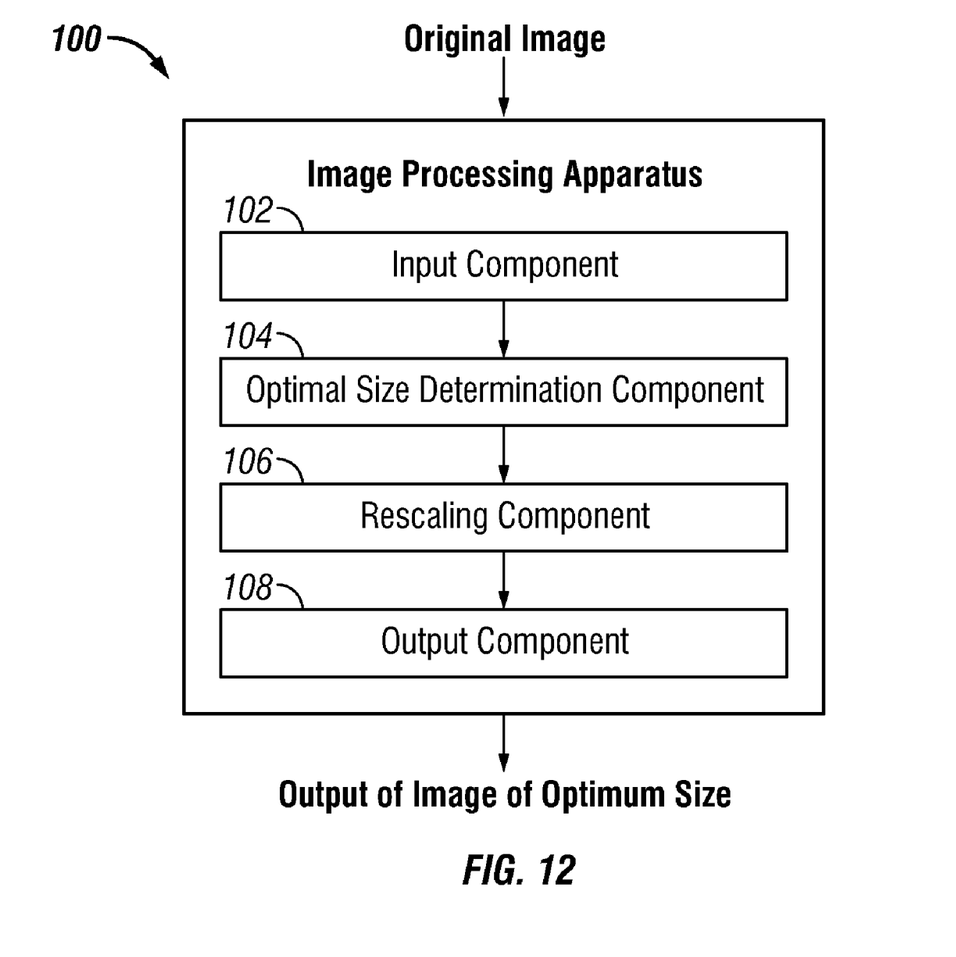
FIG. 12 shows one example of an image processing apparatus that perform a rescaling process.

FIG. 12 shows one example of an image processing apparatus 100 that may perform the rescaling process described above in connection with FIG. 10. The apparatus, which may be incorporated in an OCR engine, can be used by the OCR engine to minimize the overall image processing time while retaining image accuracy. The apparatus includes an input component 102 for receiving an input image and an optimal size determination component 104 for determining an optimum size for the input image such that the image processing time is reduced without affecting image accuracy. A rescaling component 106 is employed to resize the input image to the optimum size that has been determined by the optimal size determination component 104. An output component 108 generates the resized input image as an output, which may be employed by subsequent components of the OCR engine.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system that rescales a received image to an optimal size, comprising:
   an optimal size determination component that determines an optimum size for the image such that processing time of the received image is minimized without affecting accuracy, wherein the optimal size determination component determines the optimum size of the image based at least in part on a dominant interline spacing of text and a dominant text x-height; and a rescaling component that resizes the received image to the determined optimum size.

2. The system of claim 1, further comprising a text x-height estimation component that determines a dominant text x-height of text in the received image.

3. The system of claim 1, further comprising an inter-line spacing component that determines dominant inter-line spacing of text in the received image.

4. The system of claim 2, wherein textual lines in the received image extend in a horizontal direction and the inter-line spacing component employs a vertical projection of a horizontal Sobel filter to determine the dominant inter-line spacing of the text comprised in the received image.

5. The system of claim 4 wherein the inter-line spacing component employs an autocorrelation of the vertical projection of the horizontal Sobel filter to determine the dominant inter-line spacing of the text comprised in the received image.

6. The system of claim 5 wherein the inter-line spacing component determines a periodicity in the autocorrelation of the vertical projection of the horizontal Sobel filter and associates the periodicity with the dominant inter-line spacing.

7. The system of claim 6 wherein the inter-line spacing component determines the periodicity by calculating a magnitude spectrum of the autocorrelation of the vertical projection of the horizontal Sobel filter.

8. The system of claim 2 wherein the text x-height estimation component determines the dominant text x-height using a cross-correlation of positive and negative edges of the vertical projection of the horizontal Sobel filter.

9. A method for minimizing image processing time while retaining image accuracy comprising:

receiving an input image;

determining an optimum size for the input image such that image processing time is reduced without affecting image accuracy, wherein determining the optimum image size of the image further comprises determining a dominant inter-line spacing of text within the input image;

resizing the input image to the determined optimum size; and generating an output comprising the input image resized to the determined optimum size.

10. The method of claim 9, wherein determining the optimum size of the image comprises determining a dominant text height characteristic of text comprised within the input image.

11. The method of claim 10 further comprising determining the optimum size for the input image based at least in part on the dominant interline spacing of text and the dominant text x-height.

12. The method of claim 10 wherein determining the dominant inter-line spacing includes determining a vertical projection of a horizontal Sobel filter.

13. The method of claim 12 wherein determining the dominant inter-line spacing includes determining an autocorrelation of the vertical projection of the horizontal Sobel filter.

14. The method of claim 13 wherein determining the dominant inter-line spacing includes determining a periodicity of the autocorrelation of the vertical projection of the horizontal Sobel filter and associating the periodicity with the dominant inter-line spacing.

15. The method of claim 10 wherein determining the dominant text x-height includes determining a cross-correlation of positive and negative edges of the vertical projection of the horizontal Sobel filter.

16. A computer-readable storage medium not comprising a propagated data signal and including instructions executable by a computing system, wherein the instructions configure the computing system to perform a method for adjusting a size of an input image that includes text undergoing optical character recognition, comprising:

receiving an input image that includes text;

determining an optimum image size for the input image based at least in part on a dominant interline spacing of the text and a dominant text height;

resizing the input image to the determined optimum size; and generating an output comprising the input image resized to the determined optimum size.

17. The computer-readable storage medium of claim 16 wherein determining the optimum image size includes determining the optimum size for the image such that processing time of the input image is minimized without affecting accuracy.

18. The computer-readable storage medium of claim 16 wherein determining the dominant inter-line spacing further includes:

determining a periodicity in an autocorrelation of a vertical projection of the horizontal Sobel filter; and associating the periodicity with the dominant inter-line spacing.

* * * * *